United States Patent [19]

Sasaki

[11] Patent Number: 4,561,977

[45] Date of Patent: Dec. 31, 1985

[54] CONTRACTIBLE FUEL FILTER DEVICE

[75] Inventor: Michiaki Sasaki, Hadano, Japan

[73] Assignee: Nissan Motor Company, Limited, Yokohama, Japan

[21] Appl. No.: 587,410

[22] Filed: Mar. 8, 1984

[30] Foreign Application Priority Data

Mar. 8, 1983 [JP] Japan .................................. 58-37235

[51] Int. Cl.$^4$ .......................................... B01D 35/02
[52] U.S. Cl. .................. 210/356; 210/416.4; 210/457; 210/462
[58] Field of Search ................ 210/416.1, 416.4, 459, 210/460, 462, 356, 172, 457

[56] References Cited

U.S. PATENT DOCUMENTS

| 3,826,372 | 7/1974 | Bell | 210/460 |
|---|---|---|---|
| 3,833,124 | 9/1974 | Sugiyama et al. | 210/460 |
| 3,875,059 | 4/1975 | Maschino | 210/416.4 |
| 3,900,397 | 8/1975 | Bell | 210/416.4 |
| 4,081,379 | 3/1978 | Smith | 210/455 |
| 4,411,788 | 10/1983 | Kimura | 210/460 |
| 4,420,396 | 12/1983 | Yamamoto et al. | 210/416.4 |

FOREIGN PATENT DOCUMENTS

| 554102 | 1/1957 | Belgium | 210/460 |
|---|---|---|---|
| 929728 | 4/1955 | Fed. Rep. of Germany . | |
| 799218 | 6/1936 | France | 210/460 |
| 52-44727 | 10/1977 | Japan . | |
| 54-147316 | 10/1979 | Japan . | |
| 56-27946 | 7/1981 | Japan . | |
| 56-124256 | 9/1981 | Japan . | |
| 56-124263 | 9/1981 | Japan . | |

Primary Examiner—Richard V. Fisher
Assistant Examiner—Wanda L. Millard
Attorney, Agent, or Firm—Leydig, Voit & Mayer Ltd.

[57] ABSTRACT

A fuel filter device for use in a fuel tank, comprising an upper blank plate, a lower blank plate, a filter body having a filter portion fixed between the upper and lower blank plates, and at least one fuel suction pipe having a lower portion which is placed in the filter body, a fuel suction port being formed in a lower end portion of the fuel suction pipe characterized by the filter portion being flexible, the lower portion of the fuel suction pipe being foldable.

12 Claims, 5 Drawing Figures

CONTRACTIBLE FUEL FILTER DEVICE

BACKGROUND OF THE INVENTION

This invention relates to a fuel filter device.

FIG. 1 shows a conventional fuel filter device for filtering impurities such as dust and water so as to suck only fuel from a fuel tank. A filter portion "a" is fixed between a pair of blank plates "c" to constitute a filter body "b". A connecting portion "d" of the filter body "b" is connected to a lower end portion of a fuel suction pipe "f". The reference H denotes the distance between the lower end of the suction pipe "f" and the bottom wall of the fuel tank "e".

In such a fuel filter device, when suction and filtering stop, a large amount of fuel remains in the fuel tank "e" with the depth H. Thus, fuel suction efficiency is small.

In order to eliminate such deficiencies of the prior art filter device, for example, it may be proposed to fix the filter body "b" onto the bottom wall of the fuel tank "e" and extend the lower end of the fuel suction pipe "f" to near the bottom wall of the fuel tank. However, as the fuel suction pipe "f" is fixed to the fuel tank "e" and the filter body "b", if working and/or assembling errors occur with regard to the length of the fuel suction pipe "f" and its related members, the fuel device cannot be properly assembled. In addition, there are no margins for absorbing deforming errors of the fuel filter tank. A small clearance is apt to be formed between the fuel suction pipe "f" and the filter body "b". Impurities can easily enter into the filter body through such a clearance without filtering.

SUMMARY OF THE INVENTION

The object of this invention is to provide a fuel filter device in which some minor working errors, assembling errors and deforming margins can be disregarded and in which fuel suction efficiency is good.

According to this invention, a lower portion of a fuel suction pipe is foldable within a filter body. Also, a filter portion of the filter body is flexible. The height of the filter portion can be adjusted together with the foldable lower portion of the fuel suction pipe.

DETAILED DESCRIPTION OF PREFERRED EMBODIMENTS

Figure 1:
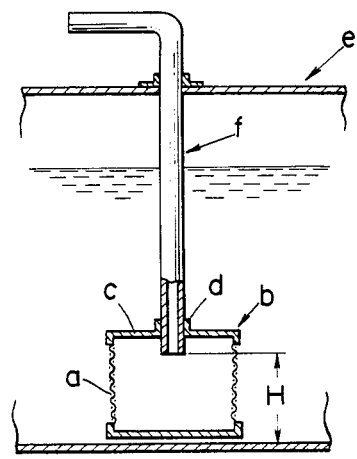
FIG. 1 is a sectional view schematically showing a prior art fuel filter device.
Figure 2:
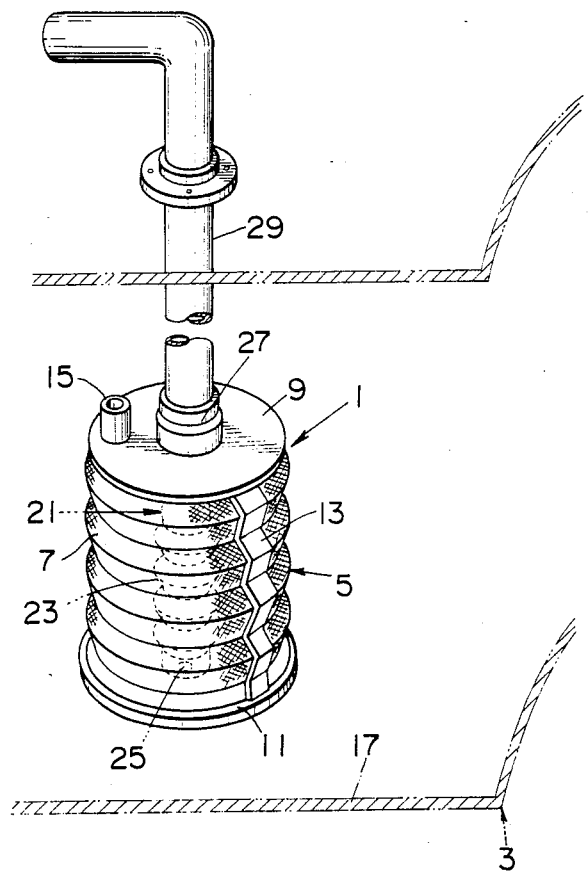
FIG. 2 is a perspective view, partially in section, of a fuel filter device according to a first embodiment of this invention.
Figure 3:
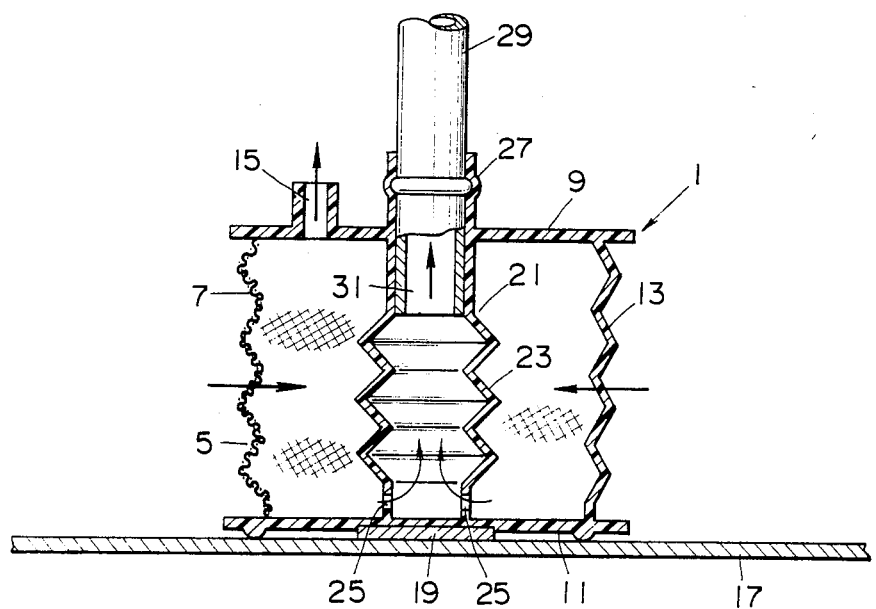
FIG. 3 is a sectional view showing a condition in which the fuel filter device of FIG. 2 is set on a bottom portion of a fuel tank.

Referring now to FIGS. 2 and 3, a fuel filter 1 is arranged in a fuel tank 3. The fuel filter 1 has a filter body 5.

The filter body 5 has a filter portion 7 at the periphery thereof. The filter portion 7 is of bellows type and has a filtering net made of synthetic resin fibers such as nylon or metal for separating the fuel from the impurities such as water or dust.

The filter portion 7 is fixed between top and bottom portions, such as a pair of upper and lower blank plates 9, 11. A rib 13 is fixed between the upper end and lower blank plates 9, 11 along the filter portion 7 in a bellows shape. The filter portion 7 and the rib 13 together can be contracted or folded as in a well-known bellows. Formed in the upper blank plate 9 is a vent hole 15 which allows the bubbles formed in the filter portion 7 to escape through the vent hole 15. A magnet 19 is attached on the lower blank plate 11 which adapts the latter to attach fixedly the filter body 5 to a bottom portion 17 of the fuel tank 3.

A fuel suction pipe has a first or lower fuel suction pipe 21 and a second or upper fuel suction pipe 29. The first fuel suction pipe 21 is formed integral with the upper and lower blank plates 9 and 11.

The first fuel suction pipe 21 has a bellows type of foldable or contractible portion 23 at its intermediate portion. One or more fuel suction ports 25 are formed in a lower end portion of the first fuel suction pipe 21.

An upper end portion of the first fuel suction pipe 21 outwardly projects from the upper blank plate 9 so as to constitute a connecting portion 27. A lower end portion 31 of the second fuel suction 29 is fixedly inserted into the connecting portion 27 so that the second fuel suction pipe 29 is joined to the first fuel suction pipe 21.

According to the fuel filter device shown in FIGS. 2 and 3, even if there are some minor work errors, assembling errors, deformations of the filter body 5 after its assembling, those can be absorbed by the bellows portion 23 of the first fuel suction pipe 21.

The fuel suction ports 25 can be positioned near the bottom 17 of the fuel tank 3. Accordingly, good filtering performance and fuel suction efficiencies can be obtained.

Also, the filter portion 7 and the rib 13 can be folded and adjusted together with the bellows portion 23 of the first fuel suction pipe 21. Therefore, even if the first fuel suction pipe 21 moves up and down, it can be smoothly moved together with the filter portion 7.

The magnet 19 can collect iron powder in the fuel tank and welding flux produced during manufacturing. The magnet 19 is detachable. In FIG. 3, the filter body 5 is directly attached to the bottom 17 of the fuel tank 3 by means of the magnet 19.

Figure 4:
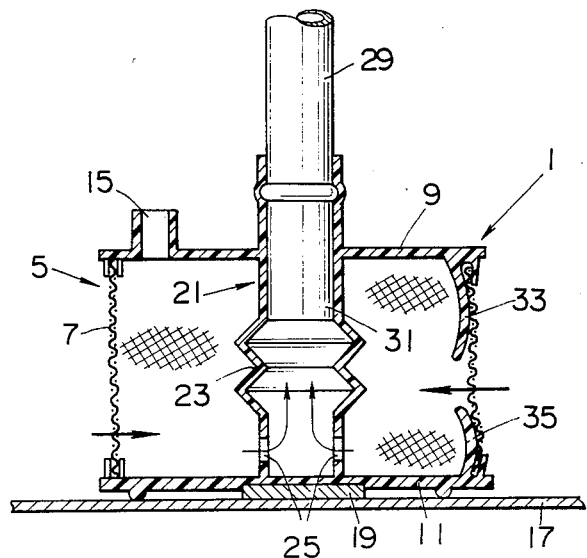
FIG. 4 is a sectional view showing a fuel filter device according to a second embodiment of this invention.
Figure 5:
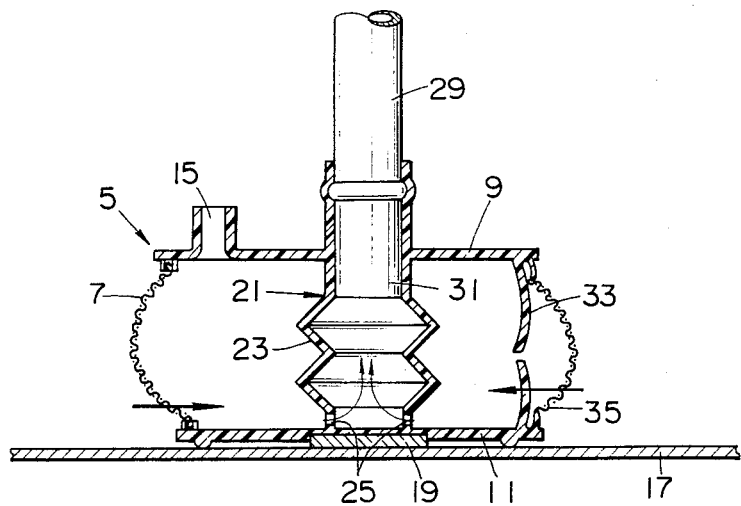
FIG. 5 is a sectional view of the fuel filter device of FIG. 4 in which the height of the fuel filter device is shortened.

FIGS. 4 and 5 show a second embodiment of this invention. An upper guide rib 33 is fixed to a peripheral portion of the upper blank plate 9. Another guide rib 35 is fixed to a peripheral portion of the lower blank plate 11. In the embodiment shown, the guide ribs 33 and 35 are formed integral with the upper and lower blank plates 9, 11 at plural portions thereof. The guide ribs 33 and 35 function to prevent the filter portion 7 from bending inwardly when the upper and lower blank plates 9 and 11 move close to each other. Except for the guide ribs 33, 35, the second embodiment is substantially the same as the first embodiment. The same reference numerals designate the same members or corresponding members so that the details thereof will not be explained.

According to the second embodiment of FIGS. 4 and 5, as in the first embodiment, the first fuel suction pipe 21 and the filter portion 7 can be folded or contracted.

What is claimed is:

1. A fuel filter device for use in a fuel tank comprising:
   a filter body having a top portion, a bottom portion adapted to be placed on the bottom of the fuel tank, and a contractible filter portion fixed between the top and bottom portions; and
   a fuel suction pipe having a contractible lower portion which is placed in the filter body and at least one fuel suction port formed in a lower end portion of the fuel suction pipe, said contractible filter portion and said contractible lower portion of the fuel suction pipe cooperating to absorb forces applied thereto.

2. The fuel filter device of claim 1 wherein said top and bottom portions comprise upper and lower blank plates, respectively.

3. The fuel filter device of claim 2 wherein the contractible lower portion of the fuel suction pipe is formed in a bellows shape.

4. The fuel filter device of claim 3 wherein the fuel suction pipe includes a lower fuel suction pipe including the lower portion and an upper fuel suction pipe joined to the lower fuel suction pipe.

5. The fuel filter device of claim 4 wherein the upper and lower blank plates are formed integral with the lower fuel suction pipe.

6. The fuel filter device of claim 2 wherein the filter portion is formed in a bellows shape.

7. The fuel filter device of claim 6 wherein a pair of upper and lower guide ribs are fixed to the upper and lower blank plates, respectively, so as to prevent the filter portion from deforming inwardly.

8. The fuel filter device of claim 2 wherein a magnet is attached to the lower blank plate.

9. The fuel filter device of claim 2 wherein a vent hole is formed in the upper blank plate.

10. The fuel filter device of claim 2 wherein a contractible rib is fixed between the upper and lower blank plates along the filter portion.

11. The fuel filter device of claim 1 wherein the fuel suction pipe is imperforate except for said at least one fuel suction port.

12. The fuel filter device of claim 11 wherein the at least one fuel suction port comprises one port.

* * * * *